US011038612B2

(12) United States Patent
Yokomakura et al.

(10) Patent No.: US 11,038,612 B2
(45) Date of Patent: Jun. 15, 2021

(54) TERMINAL DEVICE, BASE STATION APPARATUS, AND INTEGRATED CIRCUIT

(71) Applicant: SHARP KABUSHIKI KAISHA, Sakai (JP)

(72) Inventors: Kozue Yokomakura, Sakai (JP); Ryota Yamada, Sakai (JP); Katsuya Kato, Sakai (JP); Hiromichi Tomeba, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 3 days.

(21) Appl. No.: 16/059,920

(22) Filed: Aug. 9, 2018

(65) Prior Publication Data

US 2018/0351679 A1 Dec. 6, 2018

Related U.S. Application Data

(62) Division of application No. 15/111,772, filed as application No. PCT/JP2014/008022 on Nov. 20, 2014, now abandoned.

(30) Foreign Application Priority Data

Jan. 15, 2014 (JP) .................................. 2014-004854

(51) Int. Cl.
*H04J 11/00* (2006.01)
*H04L 5/00* (2006.01)
(Continued)

(52) U.S. Cl.
CPC .......... *H04J 11/005* (2013.01); *H04B 7/0452* (2013.01); *H04J 11/004* (2013.01);
(Continued)

(58) Field of Classification Search
CPC ..... H04B 7/0452; H04J 11/004; H04J 11/005; H04L 1/0003; H04L 1/0025;
(Continued)

(56) References Cited

U.S. PATENT DOCUMENTS 9,380,090 B2 * 6/2016 Davydov .............. H04L 5/0057
2013/0100906 A1 * 4/2013 Yano ..................... H04L 1/0026
370/329

(Continued)

FOREIGN PATENT DOCUMENTS

WO WO 2013/151277 A1 10/2013

OTHER PUBLICATIONS

3GPP TS 36.212 V11.3.0 (Jun. 2013), "3rd Generation Partnership Project; Technical Specification Group Radio Access Network; Evolved Universal Terrestrial Radio Access (E-UTRA) coding", (Release 11).

(Continued)

*Primary Examiner* — Khaled M Kassim
(74) *Attorney, Agent, or Firm* — Birch, Stewart, Kolasch & Birch, LLP

(57) ABSTRACT

A terminal device acquires a parameter indispensable in canceling or suppressing an interference signal, cancels or suppresses interference with high precision, and reduces a degradation in reception performance due to the interference. There is provided a first terminal device that communicates with a base station apparatus, including: a higher layer processing unit that determines NAICS information indicating whether or not NAICS has to be used; a reception unit that receives downlink control information which is transmitted from the base station apparatus; and a control unit that changes interpretation of the downlink control information based on a configuration that is determined by the higher layer processing unit, in which, in a case where (Continued)

a result of determining the NAICS information that is determined in the higher layer processing unit indicates that the NAICS has to be used, the control unit interprets the second MCS field as information indicating a modulation scheme of a second terminal device, among a first MCS field for a transport block 1 and a second MCS field for a transport block 2, which are included in the downlink control information.

4 Claims, 5 Drawing Sheets

(51) Int. Cl.
  *H04L 27/00* (2006.01)
  *H04L 1/00* (2006.01)
  *H04B 7/0452* (2017.01)
  *H04W 72/04* (2009.01)
  *H04W 72/08* (2009.01)

(52) U.S. Cl.
  CPC .......... *H04L 1/0003* (2013.01); *H04L 1/0025* (2013.01); *H04L 1/0039* (2013.01); *H04L 5/0046* (2013.01); *H04L 5/0094* (2013.01); *H04L 27/0012* (2013.01); *H04W 72/042* (2013.01); *H04W 72/082* (2013.01)

(58) Field of Classification Search
  CPC . H04L 1/0039; H04L 27/0012; H04L 5/0046; H04L 5/0094; H04W 72/042; H04W 72/082
  See application file for complete search history.

(56) References Cited

U.S. PATENT DOCUMENTS

| | | | |
|---|---|---|---|
| 2013/0182671 A1* | 7/2013 | Kakishima | H04B 7/0417 370/329 |
| 2014/0044091 A1* | 2/2014 | Kishiyama | H04L 5/0014 370/330 |
| 2014/0293890 A1* | 10/2014 | Davydov | H04B 7/0452 370/329 |
| 2014/0362769 A1* | 12/2014 | Chen | H04J 11/0036 370/328 |
| 2015/0124691 A1* | 5/2015 | Li | H04L 5/005 370/312 |
| 2015/0282192 A1* | 10/2015 | Shin | H04W 72/082 370/329 |
| 2016/0080963 A1* | 3/2016 | Marinier | H04J 11/005 370/252 |
| 2016/0226538 A1* | 8/2016 | Kim | H04B 1/123 |
| 2017/0078126 A1* | 3/2017 | Einhaus | H04W 72/042 |

OTHER PUBLICATIONS

3GPP TS 36.213 V11.4.0 (Sep. 2013), "3rd Generation Partnership Project; Technical Specification Group Radio Access Network; Evolved Universal Terrestrial Radio Access (E-UTRA); Physical layer procedures", (Release 11).

MediaTek, Renesas Mobile Europe, Broadcom Corporation, "Study on Network-Assited Interference Cancellation and Suppression for LTE", RP-130404, 3GPP TSG RAN Meeting #59, Vienne, Austria, Feb. 26-Mar. 1, 2013.

Non-Final Office Action issued in co-pending U.S. Appl. No. 15/111,772 dated Oct. 5, 2017.

Panasonic, Signalling mechanisms for interference information, 3GPP TSG-RAN WG1#75 R1-135401, Nov. 1, 2013.

* cited by examiner

TERMINAL DEVICE, BASE STATION APPARATUS, AND INTEGRATED CIRCUIT

CROSS-REFERENCE TO RELATED APPLICATIONS

This application is a Continuation of application Ser. No. 15/111,772, filed on Jul. 14, 2016, which is a National Phase under 35 U.S.C. § 371 of International Application No. PCT/JP2014/080822, filed on Nov. 20, 2014, which claims the benefit under 35 U.S.C. § 119(a) to Patent Application No. 2014-004854, filed in Japan on Jan. 15, 2014, all of which are hereby expressly incorporated by reference into the present application.

TECHNICAL FIELD

The present invention relates to a terminal device, a base station apparatus, and an integrated circuit.

BACKGROUND ART

In recent years, with the spread of smartphones and tablets, the amount of traffic in mobile transfer has continued to increase exponentially, and, from now, is expected to increase as well. As one solution to deal with such an increase in radio traffic, a study on a high-density arrangement of base stations with a heterogeneous network has been conducted. In the high-density arrangement of the base stations, low power base stations (Low Power Nodes (LPNs)) are arranged within a micro cell, a terminal device makes a connection to the low power base station, and thus the load on a micro cell base station is reduced. At this time, a problem of inter-cell interference occurs.

Furthermore, in order to improve cell throughput, a study on multi-user multiple input multiple output (MU-MIMO) with which multiple terminal devices are spatially multiplexed has been conducted as well. In the MU-MIMO, interference (the inter-user interference) among terminal devices is a problem.

To address the inter-cell interference or the inter-user interference, a study on network assisted interference cancellation and suppression (NAICS) in which the terminal device cancels or suppresses an interference signal has been conducted in 3rd Generation Partnership Project (3GPP). With the NAICS, the terminal device receives a parameter relating to a different terminal device that causes the interference, detects a signal of the different terminal device that causes the interference, using the parameter, and removes an interference signal. By doing this, the terminal device obtains a desired signal that is destined for the terminal device itself. The NAICS is disclosed in NPL 1.

Furthermore, the terminal device is notified of downlink control information (DCI) by a base station apparatus to which to make a connection, and detects a desired signal using a parameter that is included in the downlink control information. A parameter indispensable for the terminal device to detect the desired signal is included in the downlink control information, and for example, is a modulation and coding scheme (MCS) that is used for transfer by the terminal device itself, or the like. A parameter in the downlink control information is disclosed in NPL 2 and NPL 3.

CITATION LIST

Non Patent Literature

NPL 1: RP-130404, "Study on Network-Assisted Interference Cancellation and Suppression for LTE," 3GPP TSG RAN Meeting #59, Mar. 3, 2013

NPL 2: 3GPP TS 36. 212 V11.3.0 (2013-06)
NPL 3: 3GPP TS 36. 213 V11.4.0 (2013-09)

SUMMARY OF INVENTION

Technical Problem

The MCS that is included in the downlink control information, which is disclosed in NPL 2, is MCS that is used for the transfer by the terminal device itself. For this reason, in a case where the terminal device uses the NAICS, because the MCS of a different terminal device that causes the interference is difficult to acquire, the interference signal is difficult to suitably detect. Therefore, because it is difficult for the terminal device to cancel or suppress the interference signal with high precision, there is a problem in that reception performance is degraded.

An object of the present invention, which is made in view of this situation, is to provide a terminal device, a base station apparatus, and an integrated circuit, which are capable of reducing a degradation in reception performance due to interference.

Solution to Problem

In order to deal with the problems described above, configurations of a terminal device, a base station apparatus, and an integrated circuit according to the invention are as follows.

According to an aspect of the present invention, there is provided a first terminal device that communicates with a base station apparatus, including: a higher layer processing unit that determines NAICS information indicating whether or not NAICS has to be used; a reception unit that receives downlink control information which is transmitted from the base station apparatus; and a control unit that changes interpretation of the downlink control information based on a configuration that is determined by the higher layer processing unit, in which, in a case where a result of determining the NAICS information that is determined in the higher layer processing unit indicates that the NAICS has to be used, the control unit interprets the second MCS field as information indicating a modulation scheme of a second terminal device among a first MCS field for a transport block 1 and a second MCS field for a transport block 2, which are included in the downlink control information.

Furthermore, in the terminal device according to the present invention, the second MCS field includes information indicating modulation schemes of one or more of the second terminal devices.

Furthermore, in the terminal device according to the present invention, interference due to communication in the second terminal device is canceled or suppressed using the second MCS field.

Furthermore, in the terminal device according to the present invention, the second MCS field is a parameter relating to a terminal device that the base station apparatus multiplexes at the same time along with the first terminal device.

Furthermore, in the terminal device according to the present invention, the second MCS field is a parameter relating to a terminal device that makes a connection to a base station apparatus other than the base station apparatus.

According to another aspect of the present invention, there is provided a base station apparatus that communicates with a first terminal device, including: a higher layer processing unit that determines NAICS information indicating whether or not the first terminal device is instructed to use NAICS; a control unit that changes a parameter of downlink control information based on whether or not the NAICS information indicates that the NAICS has to be used; and a transmission unit that transmits the downlink control information, in which, in a case where the NAICS information indicates that the NAICS has to be used, among a first MCS field for a transport block 1 and a second MCS field for a transport block 2, which are included in the downlink control information, information indicating a modulation scheme of a second terminal device is configured to be in the second MCS field, and the first MCS field and the second MCS field are transmitted to the first terminal device.

According to a further aspect of the present invention, there is provided an integrated circuit that is mounted into a first terminal device that communicates with a base station apparatus, including: a determination unit that determines NAICS information indicating whether or not NAICS has to be used; and an interpretation unit that interprets a second MCS field as information indicating a modulation scheme of a second terminal device, among a first MCS field for a transport block 1 and the second MCS field for a transport block 2, which are included in downlink control information, in a case where a result of determining the NAICS information indicates that the NAICS has to be used.

According to a still further aspect of the present invention, there is provided an integrated circuit that is mounted into a base station apparatus that communicates with a first terminal device, including: a first configuration unit that determines NAICS information indicating whether or not the first terminal device is instructed to use NAICS; a second configuration unit that configures information indicating a modulation scheme of a second terminal device to be in a second MCS field, among a first MCS field for a transport block 1 and the second MCS field for a transport block 2, which are included in downlink control information, in a case where the NAICS information indicates that the NAICS has to be used; and a notification unit that notifies the first terminal device of the first MCS field and the second MCS field.

Advantageous Effects of Invention

According to the present invention, a terminal device can acquire a parameter indispensable in canceling or suppressing an interference signal. Furthermore, using the acquired parameter, the terminal device can cancel or suppress the interference signal with high precision, and can reduce a degradation in reception performance due to interference.

DESCRIPTION OF EMBODIMENTS

A communication system according to the present embodiment includes a base station apparatus (a transmission apparatus, a cell, a transmission point, a transmit antenna group, a transmit antenna port group, a component carrier, or an eNodeB) and a terminal device (a terminal, a mobile terminal, a reception point, a reception terminal, a reception device, a receive antenna group, a receive antenna port group or UE).

According to the present embodiment, "X/Y" includes the meaning of "X or Y". According to the present embodiment, "X/Y" includes the meaning of "X and Y". According to the present embodiment, "X/Y" includes the meaning of "X and/or Y".

Figure 1:
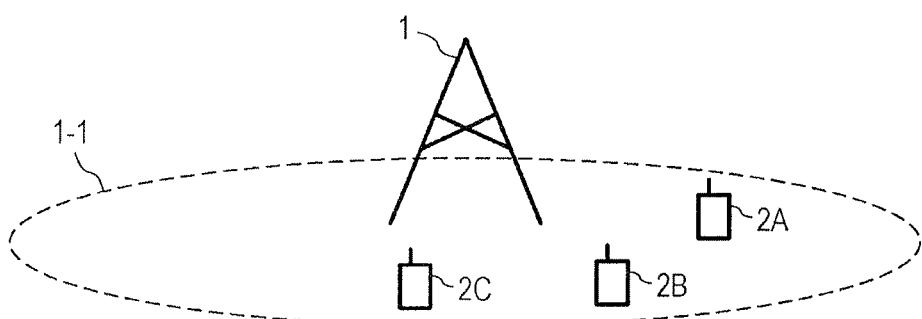
FIG. 1 is a diagram illustrating an example of a communication system according to the present embodiment.

FIG. 1 is a diagram illustrating one example of the communication system according to the present embodiment. As illustrated in FIG. 1, the communication system according to the present embodiment includes a base station apparatus 1 and terminal devices 2A, 2B, and 2C. Furthermore, coverage 1-1 is a range (a communication area) in which it is possible for the base station apparatus 1 to connect to the terminal device. The terminal devices 2A, 2B, and 2C will also be described as a terminal device 2.

In FIG. 1, the base station apparatus 1 spatially multiplexes the terminal devices 2A, 2B, and 2C. Reception signals in the terminal device 2 include a desired signal that is destined for the terminal device 2 itself (which is also referred to as a first terminal device) and a signal that is desired for a terminal device (which is referred to as a second terminal device) that causes interference. Specifically, the reception signals in the terminal device 2A include a desired signal that is destined for the terminal device 2A itself, which is transmitted from the base station apparatus 1, an interference signal that is a signal which is destined from the terminal device 2B, and an interference signal that is a signal which is destined for the terminal device 2C. Furthermore, reception signals in the terminal device 2B include a desired signal that is destined from the terminal device 2B itself, which is transmitted from the base station apparatus 1, an interference signal that is a signal which is destined for the terminal device 2A, and an interference signal that is a signal which is destined for the terminal device 2C. Furthermore, reception signals in the terminal device 2C include a desired signal that is destined for the terminal device 2C itself, which is transmitted from the base station apparatus 1, an interference signal that is a signal which is destined for the terminal device 2A, and an interference signal that is a signal which is destined from the terminal device 2B. In this manner, according to the present embodiment, if the base station apparatus spatially multiplexes multiple terminal devices and thus the terminal device suffers from inter-user interference, this case may not matter. No limitation to the communication system in FIG. 1 is imposed.

In FIG. 1, in uplink wireless communication from the terminal device 2 to the base station apparatus 1, the following uplink physical channels are used. The uplink physical channels are used to transmit information that is output from a higher layer.

Physical Uplink Control Channel (PUCCH)
Physical Uplink Shared Channel (PUSCH)
Physical Random Access Channel (PRACH)

The PUCCH is used to transmit uplink control information (UCI). At this point, the uplink control information includes a positive acknowledgement (ACK) or a negative acknowledgement (NACK) (ACK/NACK) of downlink data (a downlink transport block or a Downlink-Shared Channel (DL-SCH)). The ACK/NACK of the downlink data is also referred to as an HARQ-ACK or HARQ feedback.

Furthermore, the uplink control information includes a channel state information (CSI) for downlink. Furthermore, the uplink control information includes a scheduling request (SR) that is used to make a request for a resource for an uplink-shared channel (UL-SCH).

The PUSCH is used to transmit uplink data (an uplink transport block or the UL-SCH). Furthermore, the PUSCH may be used to transmit the ACK/NACK and/or the channel state information, along with the uplink data. Furthermore, the PUSCH may be used to transmit only the uplink control information.

Furthermore, the PUSCH may be used to transmit an RRC message. The RRC message is a piece of information/signal that is processing in a radio resource control (RRC) layer. Furthermore, the PUSCH is used to transmit a MAC control element (CE). At this point, the MAC CE is a piece of information/signal that is processed (transmitted) in a medium access control (MAC) layer.

For example, the power headroom may be included in the MAC CE and may be reported through the PUSCH. That is, a MAC CE field may be used to indicate a level of the power headroom.

The PRACH is used to transmit a random access preamble.

Furthermore, in the uplink wireless communication, an uplink reference signal (UL RS) is used as an uplink physical signal. The uplink physical signal is not used to transmit the information that is output from the higher layer, but is used by a physical layer. At this point, a demodulation reference signal (DMRS) and a sounding reference signal (SRS) are included in the uplink reference signal.

The DMRS is associated with transmission of the PUSCH or the PUCCH. For example, the base station apparatus 1 uses the DMRS to perform channel reconfiguration of the PUSCH or the PUCCH. The SRS is not associated with the transmission of the PUSCH or the PUCCH. For example, the base station apparatus 1 uses the SRS to measure an uplink channel state.

In FIG. 1, downlink wireless communication from the base station apparatus 1 to the terminal device 2, the following downlink physical channels are used. The downlink physical channels are used to transmit the information that is output from the higher layer.

Physical Broadcast Channel (PBCH)
Physical Control Format Indicator Channel (PCFICH)
Physical Hybrid Automatic Repeat Request Indicator Channel (PHICH)
Physical Downlink Control Channel (PDCCH)
Enhanced Physical Downlink Control Channel (EPDCCH)
Physical Downlink Shared Channel (PDSCH)

The PBCH is used to broadcast a master information block (MIB) (Broadcast Channel (BCH)) that is used in a shared manner in the terminal device 2. The PCFICH is used to information indicating a region (for example, the number of OFDM symbols) that is used for transmission of the PDCCH.

The PHICH is used to transmit the ACK/NACK of the uplink data that is received by the base station apparatus 1. That is, the PHICH is used to transmit an HARQ indicator (HARQ feedback) indicating the ACK/NACK of the uplink data.

The PDCCH and the EPDCCH are used to transmit downlink control information (DCI). At this point, multiple DCI formats are defined for transmission of the downlink control information. That is, a field for the downlink control information is defined in a DCI format and is mapped to information bit.

For example, DCI format 1A that is used for scheduling of one PDSCH (transmission of one downlink transport block) in one cell is defined as a DCI format for downlink.

For example, information relating to PDSCH resource allocation, information relating to a modulation and coding scheme (MCS) for the PDSCH, and the downlink control information such as a TPC command for the PUSCH are included in the DCI format for the downlink. At this point, the DCI format for the downlink is also referred to as a downlink grant (or downlink assignment).

Furthermore, for example, DCI format 0 that is used for scheduling of one PUSCH (transmission of one uplink transport block) in one cell is defined as a DCI format for uplink.

For example, information relating to resource allocation of the PUSCH, information relating to the MCS for the PUSCH, uplink control information such as a TPC command for the PUSCH are included in the DCI format for the uplink. The DCI format for the uplink is also referred to as an uplink grant (or an uplink assignment).

In a case where a PDSCH resource is scheduled using the downlink assignment, the terminal device 2 receives the downlink data, on the scheduled PDSCH. Further, in a case where a PUSCH resource is scheduled using the uplink grant, the terminal device 2 transmits the uplink data and/or the uplink control information, on the scheduled PUSCH.

The PDSCH is used to transmit the downlink data (the downlink transport block or the DL-SCH). Furthermore, the PDSCH is used to transmit a system information block type-1 message. The system information block type-1 message is cell-specific (cell-peculiar) information.

Furthermore, the PDSCH is used to transmit system information message. The system information message includes a system information block X other than the system information block type-1. The system information message is cell-specific (cell-peculiar) information.

Furthermore, the PDSCH is used to transmit the RRC message. At this point, the RRC message that is transmitted from the base station apparatus 1 may be common to multiple terminal devices 2 within the cell. Furthermore, the RRC message that is transmitted from the base station apparatus 1 may be a message (which is also referred to as dedicated signaling) dedicated to a certain terminal device 2. That is, user equipment-specific (user equipment-peculiar) information is transmitted using a message dedicated to a certain terminal device 2. Furthermore, the PDSCH is used to transmit the MAC CE.

At this point, the RRC message and/or the MAC CE are also referred to as higher-layer signaling.

Furthermore, in the downlink radio communication, a synchronization signal (SS) and a downlink reference signal (DL RS) are used as downlink reference signals. The downlink physical signal is not used to transmit the information that is output from the higher layer, but is used by the physical layer.

The synchronization signal is used in order for the terminal device 2 to be synchronized to a frequency domain for and a time domain for downlink. Furthermore, the downlink reference signal is used in order for the terminal device 2 to perform the channel reconfiguration of the downlink physical channel. For example, the downlink reference signal is used for the terminal device 2 to calculate downlink channel state information.

At this point, a cell-specific reference signal (CRS), a LIE-specific reference signal (URS) associated with the PDSCH, a demodulation reference signal (DMRS) associated with the EPDCCH, a non-zero power chanel state information-reference signal (NZP CSI-RS), and a zero power chanel state information-reference signal (ZP CSI-RS) are included in the downlink reference signal.

The CRS is transmitted in all bands for a subframe, and is used to perform demodulation of the PBCH/PDCCH/PHICH/PCFICH/PDSCH. The URS associated with the PDSCH is transmitted on and in a subframe and a band that are used for transmission of the PDSCH with which the URS is associated, and is used to perform the demodulation of the PDSCH with which the URS is associated.

The DMRS associated with the EPDCCH is transmitted on and in a subframe and a band that are used for transmission of the EPDCCH with which the DMRS is associated. The DMRS is used to perform demodulation of the EPDCCH with which the DMRS is associated.

A resource for the NZP CSI-RS is configured by the base station apparatus 1. For example, the terminal device 2 performs signal measurement (channel measurement) using the NZP CSI-RS. A resource for the ZP CSI-RS is configured by the base station apparatus 1. With a zero output, the base station apparatus 1 transmits the ZP CSI-RS. For example, the terminal device 2 performs interference measurement on a resource to which the NZP CSI-RS corresponds.

At this point, the downlink physical channel and the downlink physical signal are also collectively referred to as a downlink signal. Furthermore, the uplink physical channel and the uplink physical signal are also collectively referred to as an uplink signal. Furthermore, the downlink physical channel and the uplink physical channel are also collectively referred to as a physical channel. Furthermore, the downlink physical signal and the uplink physical signal are also collectively referred to as a physical signal.

Furthermore, a BCH, a UL-SCH and a DL-SCH are transport channels. A channel that is used in a MAC layer is referred to as a transport channel. Furthermore, a unit of the transport channel that is used in the MAC layer is also referred to as a transport block (TB) or a MAC protocol data unit (PDU). The transport block is a unit in which the MAC layer delivers data to the physical layer. In the physical layer, the transport block is mapped to a codeword, and coding processing and the like are performed on every codeword.

Figure 2:
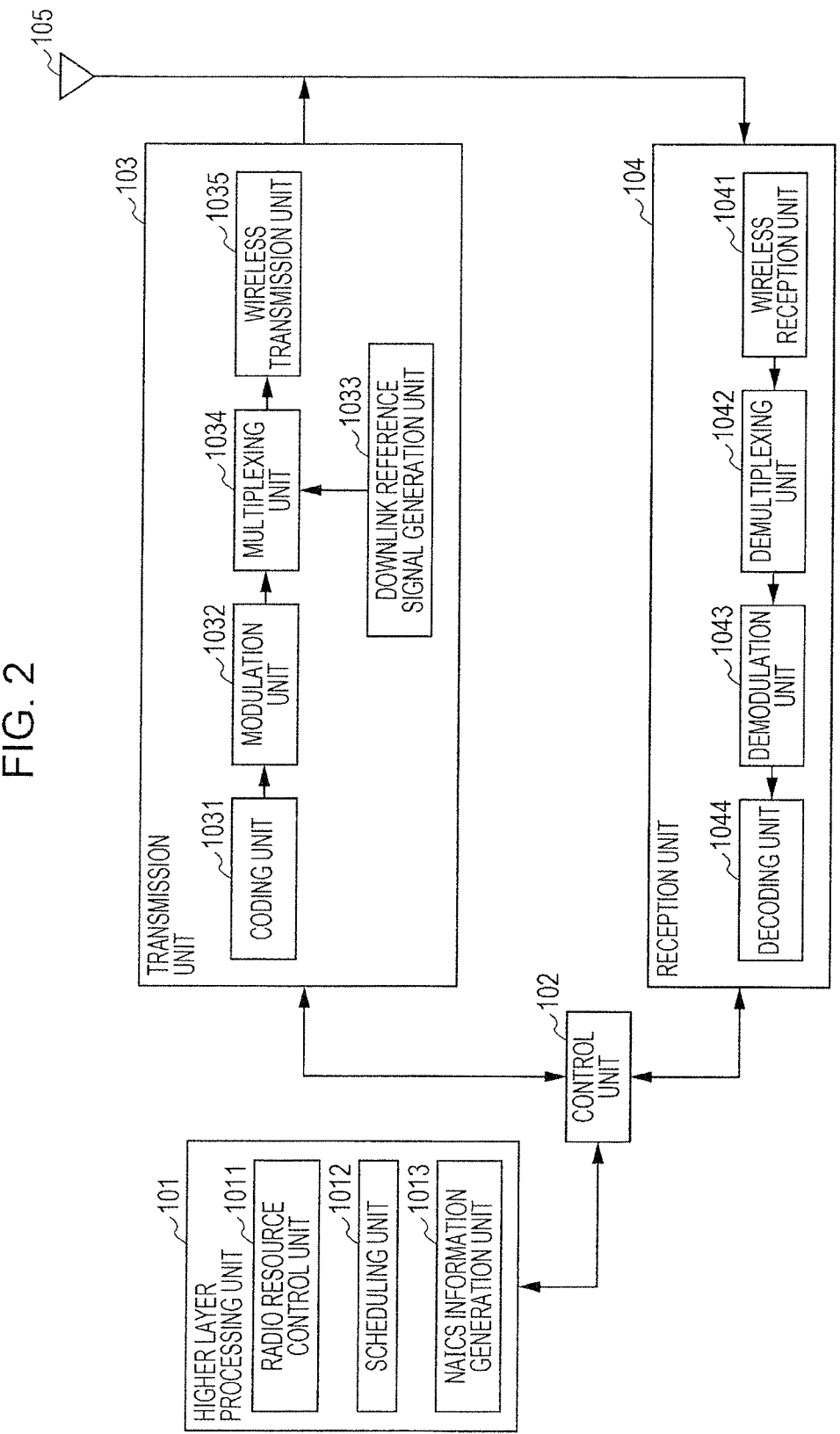
FIG. 2 is a schematic block diagram illustrating a configuration of a base station apparatus 1 according to the present embodiment.

FIG. 2 is a schematic block diagram illustrating a configuration of the base station apparatus 1 according to the present embodiment. As illustrated in FIG. 2, the base station apparatus 1 is constituted to include a higher layer processing unit 101, a control unit 102, a transmission unit 103, a reception unit 104, and a transmit and receive antenna 105. Furthermore, the higher layer processing unit 101 is constituted to include a radio resource control unit 1011, a scheduling unit 1012, and an NAICS information generation unit 1013. Furthermore, the transmission unit 103 is constituted to include a coding unit 1031, a modulation unit 1032, a downlink reference signal generation unit 1033, a multiplexing unit 1034, and a wireless transmission unit 1035. Furthermore, the reception unit 104 is constituted from a wireless reception unit 1041, a demultiplexing unit 1042, a demodulation unit 1043, and a decoding unit 1044.

The higher layer processing unit 101 performs processing of the medium access control (MAC) layer, a packet data convergence protocol (PDCP) layer, a radio link control (RLC) layer, and the radio resource control (RRC) layer. Furthermore, the higher layer processing unit 101 generates information indispensable to perform control of the transmission unit 103 and the reception unit 104, and outputs the generated information to the control unit 102.

The radio resource control unit 1011 generates or acquires from a higher node the downlink data (the transport block) that is arranged in the PDSCH for the downlink, the system information, the RRC message, the MAC CE, and the like. The radio resource control unit 1011 outputs the downlink data to the transmission unit 103, and other pieces of information to the control unit 102. Furthermore, the radio resource control unit 1011 manages various pieces of configuration information of the terminal device 2.

The scheduling unit 1012 determines a frequency and a subframe to which the physical channels (the PDSCH and PUSCH), a coding rate and a modulation scheme (the MCS) of and for the physical channel (the PDSCH and the PUSCH), transmit power, and the like. The scheduling unit 1012 outputs pieces of information that are determined, to the control unit 102.

The scheduling unit 1012 generates information that is used for scheduling of the physical channels (the PDSCH and the PUSCH), based on a result of the scheduling. The scheduling unit 1012 outputs the generated information to the control unit 102. According to the present embodiment, as one example, the scheduling unit 1012 schedules the terminal device 2A, the terminal device 2B, and the terminal device 2C with the same resource. Moreover, according to the present embodiment, for simplicity, it is assumed that the same resource is used, but on the condition that the terminal device 2A can acquire resources that are allocated to the terminal device 2B and the terminal device 2C, the scheduling may be performed with different resources.

The NAICS information generation unit 1013 generates NAICS information and outputs the generated NAICS to the control unit 102. The NAICS information is information that indicates whether the base station apparatus 1 instructs the terminal device 2 to perform cancellation or suppression of the interference signal using NAICS. The NAICS information is used when the base station apparatus 1 generates the downlink control information of the terminal device 2. For example, in a case where the NAICS information of the terminal device 2A indicates that the NAICS has to be used, the base station apparatus 1 generates the downlink control information of the terminal device 2A in such a manner that information indispensable for the terminal device 2A to performing reception processing using the NAICS is included. Moreover, the NAICS information generation unit 1013 may generate the NAICS information based on information that is included in terminal information that is notified from the terminal device 2, and the base station apparatus 1 may generate the NAICS information regardless of the terminal information. For example, in a case where the base station apparatus 1 notifies information relating to the terminal device that causes the interference, as the downlink control information, the NAICS information generation unit 1013 may generate the NAICS information in such a manner that the number of terminal devices that are instructed to use the NAICS and the number of terminal devices that is notified, as the downlink control information are consistent with each other. Furthermore, the NAICS information is not limited to a case where an NAICS scheme is used, and application thereof is possible in any case where a scheme of canceling and suppressing the interference signal is used.

Based on information that is input from the higher layer processing unit 101, the control unit 102 generates a control signal for performing control of the transmission unit 103 and the reception unit 104. Furthermore, based on the information that is input from the higher layer processing unit 101, the control unit 102 determines the MCS.

Based on the information that is input from the higher layer processing unit 101, the control unit 102 generates the downlink control information, and outputs the generated downlink control information to the transmission unit 103. Moreover, the NAICS information may be included in the downlink control information.

Based on the NAICS information, the control unit 102 configures a first MCS field for a transport block 1 and a second MCS field for a transport block 2, which are included in the downlink control information. In a case where the NAICS information indicates that the NAICS has to be used, the control unit 102 configures information indicating the modulation scheme of the terminal device that causes the interference, to be in the second MCS field. The information indicating the modulation scheme is also referred to as a modulation order (MO).

The transmission unit 103 generates the downlink reference signal in accordance with the control signal that is input from the control unit 102, codes and modulates the HARQ indicator, the downlink control information, and the downlink data that are input from the higher layer processing unit 101, multiplexes the PHICH, the PDCCH, the EPDCCH, the PDSCH, and the downlink reference signal, and transmits the resulting signal to the terminal device 2 through the transmit and receive antenna unit 105.

The coding unit 1031 performs coding on the HARQ indicator, the downlink control information, and the downlink data that are input from the higher layer processing unit 101. When performing the coding, the coding unit 1031 uses a coding scheme that is prescribed in advance, such as a block coding, convolutional coding, or turbo coding, or uses a coding scheme that is determined by the radio resource control unit 1011. The modulation unit 1032 performs modulation on coded bits that are input from the coding unit 1031, using a modulation scheme that is prescribed in advance, such as binary phase shift keying (BPSK), quadrature phase shift keying (QPSK), 16 quadrature amplitude modulation (QAM), 64 QAM, or 256 QAM, or using a modulation scheme that is determined by the radio resource control unit 1011.

The downlink reference signal generation unit 1033 generates as the downlink reference signal a sequence that is already known to the terminal device 2, which is obtained according to a rule that is prescribed in advance based on a physical cell identifier (PCI) for identifying the base station apparatus 1, and the like.

The multiplexing unit 1034 multiplexes a modulation symbol of each channel, which results from the modulation, the generated downlink reference signal, and the downlink control information. More precisely, the multiplexing unit 1034 maps the modulation symbol of each channel, which results from the modulation, the generated downlink reference signal, and the downlink control information to resource elements.

The wireless transmission unit 1035 performs Inverse Fast Fourier Transform (IFFT) on the modulation symbol and the like that result from the multiplexing, performs the modulation in compliance with an OFDM scheme, attaches an guard interval to an OFDM symbol that results from OFDM modulation, generates a digital signal in a baseband, converts the digital signal in the baseband into an analog signal, generates an in-phase component and an orthogonal component at an intermediate frequency from the analog signal, removes superfluous frequency components using a low pass filter, performs up-conversion to a carrier frequency, performs power amplification, and transmits a final result to the transmit and receive antenna 105 for transmission.

In accordance with the control signal that is input from the control unit 102, the reception unit 104 demultiplexer, demodulates, and decodes a reception signal that is received from the terminal device 2 through the transmit and receive antenna 105, and outputs information that results from the decoding, to the higher layer processing unit 101.

The wireless reception unit 1041 converts an uplink signal that is received through the transmit and receive antenna 105, into a signal in a base band by performing down-convert, removes a unnecessary frequency component, controls an amplification level in such a manner that a signal level is suitably maintained, performs orthogonal demodulation based on an in phase component and an orthogonal component of the received signal, and converts an analog signal that results from the orthogonal demodulation, into a digital signal.

The wireless reception unit 1041 removes a portion corresponding to a guard interval (GI) from the digital signal that results from the conversion. The wireless reception unit 1041 performs fast Fourier Transform (FFT) on a signal from which the guide interval is removed, and outputs the resulting signal to the demultiplexing unit 1042 that extracts area signal in the frequency domain.

The demultiplexing unit 1042 demultiplexes the signal that is input from the wireless reception unit 1041 into the PUCCH, the PUSCH, and the signal such as the uplink reference signal. Moreover, the demultiplexing is performed based on radio resource allocation information that is determined in advance by the base station apparatus 1, using the radio resource control unit 1011, and that is included in the uplink grant that notified to each of the terminal devices 2A, 2B, and 2C.

Furthermore, the demultiplexing unit 1042 performs channel compensation on the PUCCH and the PUSCH. Furthermore, the demultiplexing unit 1042 demultiplexes the uplink reference signal.

The demodulation unit 1043 performs Inverse Discrete Fourier Transform (IDFT) on the PUSCH, acquires the modulation symbol, and performs reception signal demodulation on each of the modulation symbols on the PUCCH and the PUSCH, using the modulation scheme that is prescribed in advance, such as the BPSK, the QPSK, the 16 QAM, the 64 QAM, or the 256 QAM, or using the modulation scheme that is notified, in advance, with the uplink grant, to each of the terminal devices 2A, 2B, and 2C by the base station apparatus 1 itself.

The decoding unit 1044 performs the decoding on coded bits of the PUCCH and the PUSCH that result from the demodulation, at a coding rate in compliance with the coding scheme that is prescribed in advance, which is prescribed in advance, or at a coding rate which is notified in advance with the uplink grant to the terminal device 2 by the base station apparatus 1 itself, and outputs uplink data and uplink control information that result from the decoding, to the higher layer processing unit 101. In the case of re-transmission of the PUSCH, the decoding unit 1044 performs the decoding using the coded bits that are input from the higher layer processing unit 101 and that are retained in an HARQ buffer, and the coded bits that result from the demodulation.

Figure 3:
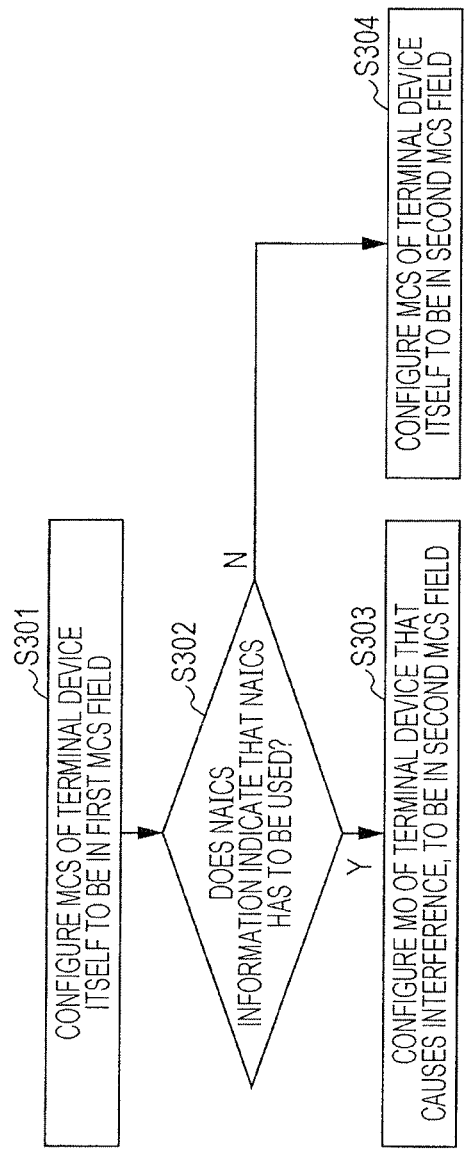
FIG. 3 is a diagram illustrating a processing flow for configuring a first MCS field and a second MCS field in a control unit 102.

FIG. 3 is a diagram illustrating a processing flow for configuring the first MCS field and the second MCS field in the control unit 102. At this point, as one example, it is assumed that pieces of NAICS information of the terminal device 2A and the terminal device 2B indicates that the NAICS has to be used, and the NAICS information of the terminal device 2C does not indicate that the NAICS has to be used.

In S301, the control unit 102 configures the MCS of the terminal device itself to be in the first MCS field. In an example according to the present embodiment, the control unit 102 configures the MCS of the terminal device 2A to be in the first MCS field of the terminal device 2A. Furthermore, the control unit 102 configures the MCS of the terminal device 2B to be in the first MCS field of the terminal device 2B. Furthermore, the control unit 102 configures the MCS of the terminal device 2C to be in the first MCS field of the terminal device 2C.

In S302, the control unit 102 determines whether or not the NAICS information of the terminal device 2 indicates that the NAICS has to be used. In a case where the NAICS information of the terminal device 2 indicates that the NAICS has to be used, proceeding to S303 takes place, and in a case where the NAICS information thereof does not indicate that NAICS has to be used, proceeding to S304 takes place. In the example according to the present embodiment, in the cases of the terminal device 2A and the terminal device 2B, because the NAICS information indicates that the NAICS has to be used, proceeding to S303 takes place. On the other hand, in the case of the terminal device 2C, because the NAICS information does not indicate that the NAICS has to be used, proceeding to S304 takes places.

In S303, the control unit 102 configures the MO of the terminal device that causes the interference, to be in the second MCS field. In the example according to the present embodiment, the control unit 102 configures the MO of the terminal device 2B and the MO of the terminal device 2C to be in the second MCS field of the terminal device 2A. For example, in a case where the second MCS field is constituted from five bits, among the five bits, the MO of the terminal device 2B is configured using two bits, and the MO of the terminal device 2C is configured using two bits. For example, in the cases of the QPSK, the 16 QAM, the 64 QAM, and the 256 QAM, the MOs are configured to be "00", "01", "10", and "11", respectively. Moreover, this is one example, other modulation schemes may be included. Furthermore, a method of configuring the MO to be in the second MCS field and the number of terminal devices that cause the interference are not limited to those described above, and any method in which the MO of the terminal device that causes the interference is configured using the number of bits that are allocated to the second MCS field may be included in the present invention. Furthermore, the control unit 102 configures the MO of the terminal device 2A and the MO of the terminal device 2C to be in the second MCS field of the terminal device 2B. Moreover, in a case where one terminal device causes the interference and the one terminal device that causes the interference performs transfer of the one transport block (codeword), the control unit 102 may configure the MO of the one terminal device to be in the second MCS field. Furthermore, the base station apparatus may notify the MCS of the one terminal device instead of the MO of the one terminal device, and the terminal device may interpret a modulation scheme that corresponds to the MCS which is notified, as the MO. Furthermore, in a case where one terminal device causes the interference and the one terminal device that causes the interference performs transfer of two transport blocks, the control unit 102 may configure the MO of each transport block to be in the second MCS field.

In S304, the control unit 102 configures the MCS of the terminal device itself to be in the second MCS field. In the example according to the present embodiment, the control unit 102 configures the MCS of the terminal device 2C to be in the second MCS field of the terminal device 2C, or if the terminal device 2C performs transmission on one transport block, configures a code point indicating that the second MCS field is invalid, to be in the downlink control information.

In this manner, in a case where the base station apparatus 1 instructs the terminal device 2 to use the NAICS, the control unit 102 configures the MO of the terminal device that causes the interference, to be in the second MCS field. More precisely, in a case where the base station apparatus 1 instructs the terminal device 2 to use the NAICS, the base station apparatus 1 notifies information indispensable for the terminal device 2 to suppress or cancel the interference.

Figure 4:
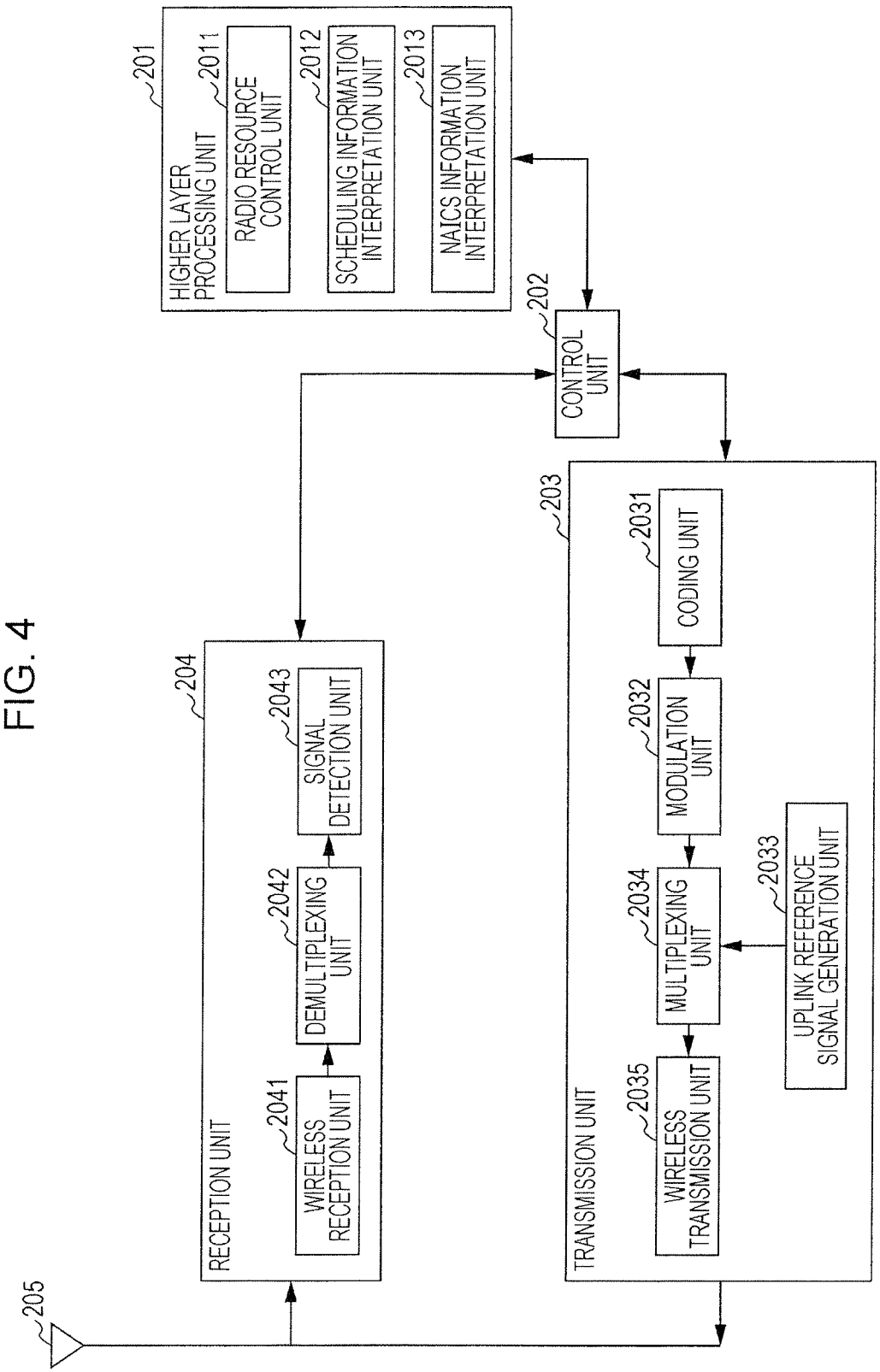
FIG. 4 is a schematic block diagram illustrating a configuration of a terminal device 2 according to the present embodiment.

FIG. 4 is a schematic block diagram illustrating a configuration of the terminal device 2 according to the present embodiment. As illustrated in FIG. 4, the terminal device 2 is constituted to include a higher layer processing unit 201, a control unit 202, a transmission unit 203, a reception unit 204, and a transmit and receive antenna 205. Furthermore, the higher layer processing unit 201 is constituted to include a radio resource control unit 2011, a scheduling information interpretation unit 2012, and an NAICS information interpretation unit 2013. Furthermore, the transmission unit 203 is constituted to include a coding unit 2031, a modulation unit 2032, an uplink reference signal generation unit 2033, a multiplexing unit 2034, and a wireless transmission unit 2035. Furthermore, the reception unit 204 is constituted to include a wireless reception unit 2041, a demultiplexing unit 2042, and a signal detection unit 2043.

The higher layer processing unit 201 outputs the uplink data (the transport block) that is generated by a user operation and the like, to the transmission unit 203. Furthermore, the higher layer processing unit 201 performs the processing of the medium access control (MAC) layer, the packet data convergence protocol (PDCP) layer, the radio link control (RLC) layer, and the radio resource control (RRC) layer.

The radio resource control unit 2011 manages various pieces of configuration information of the terminal device itself. Furthermore, the radio resource control unit 2011 generates information that is arranged in each uplink channel and outputs the generated information to the transmission unit 203.

The scheduling information interpretation unit 2012 interprets the downlink control information that is received through the reception unit 204 and determines scheduling information. Furthermore, the scheduling information interpretation unit 2012 generates control information in order to perform control of the reception unit 204 and the transmission unit 203 based on the scheduling information, and outputs the generated control information to the control unit 202.

The NAICS information interpretation unit 2013 interprets the NAICS information that is received through the reception unit 204, and determines whether or not an NAICS instruction is present. Furthermore, the NAICS information interpretation unit 2013 outputs a result of determining the NAICS information to the control unit 202. Moreover, the NAICS information interpretation unit 2013 may determine the result of determining the NAICS information, depending on a situation (a reception quality or the like) of the terminal device 2.

Furthermore, the NAICS information interpretation unit 2013 generates the terminal information and outputs the generated terminal information to the control unit 202. Moreover, the terminal information is information relating to a function that the terminal device 2 has. For example, the terminal information may be information indicating whether or not the terminal device 2 has an NAICS function, and regardless of whether or not the terminal device 2 has the NAICS function, may be information that results from determining whether or not the NAICS is performed considering the reception quality or the like.

Based on the information that is input from the higher layer processing unit 201, the control unit 202 generates a control signal for performing control of the reception unit 204 and the transmission unit 203. The control unit 202 outputs the generated control signal to the reception unit 204 and the transmission unit 203 and performs the control of the reception unit 204 and the transmission unit 203. The control unit 202 outputs the result of determining the NAICS information to the reception unit 204 and outputs the uplink control information and the uplink data that include the terminal information and the like, to the transmission unit 203.

The control unit 202 interprets the downlink control information that is received through the reception unit 204, and outputs the first MCS field and the second MCS field to the reception unit 204. Furthermore, the control unit 202 outputs the result of determining the NAICS information to the reception unit 204.

In accordance with a control signal that is input from the control unit 202, the reception unit 204 demultiplexes, demodulates, and decodes a reception signal that is received from the base station apparatus 1 through the transmit and receive antenna 205, and outputs information that results from the decoding, to the higher layer processing unit 201.

The wireless reception unit 2041 converts (down-converts) a downlink signal that is received through the transmit and receive antenna 205, into a signal in a baseband by performing the orthogonal demodulation, removes a unnecessary frequency component, controls an amplification level in such a manner that a signal level is suitably maintained, performs orthogonal demodulation based on an in-phase component and an orthogonal component of the received signal, and converts an analog signal that results from the orthogonal demodulation, into a digital signal.

Furthermore, the wireless reception unit 2041 removes a portion equivalent to a guard interval (GI) from the digital signal that results from the conversion, performs fast Fourier Transform (FFT) on the signal from which the guide interval is removed, and extracts a signal in the frequency domain.

The demultiplexing unit 2042 demultiplexes a signal that results from the extraction, into the PHICH, the PDCCH, the EPDCCH, the PDSCH, and the downlink reference signal. Furthermore, the demultiplexing unit 2042 performs channel compensation on the PHICH, the PDCCH, and the EPDCCH based on a channel estimate of a desired signal that is acquired from channel measurement, detects the downlink control information, and outputs the detected downlink control information to the control unit 202. Furthermore, the control unit 202 outputs the PDSCH and the channel estimate of the desired signal to the signal detection unit 2043.

Furthermore, the demultiplexing unit 2042 performs the channel estimate of the interference signal. The demultiplexing unit 2042 outputs the channel estimate of the interference signal to the signal detection unit 2043.

The signal detection unit 2043 detects the downlink data (the transport block) using the PDSCH, the channel estimate, and the result of determining the NAICS information, and outputs a result of the detection to the higher layer processing unit 201. In a case where the result of determining the NAICS information indicates that the NAICS has to be used, the signal detection unit 2043 interprets the second MCS field as the MO of the terminal device that causes the interference, and performs the cancellation and the suppression of the interference signal using the second MCS field. Moreover, a method of canceling or suppressing the interference signal may be a method that needs a parameter relating to the interference signal, and is linear detection, maximum likelihood estimation, an interference canceler, or the like. The linear detection is linear minimum mean square error-interference rejection combining (LMMSE-IRC), enhanced LMMSE-IRC, widely linear MMSE-IRC (WL MMSE-IRC), or the like. The maximum likelihood estimation is maximum likelihood (ML), reduced complexity ML (R-ML), or the like. The interference canceler is parallel interference cancellation (PIC), symbol level interference cancellation (SLIC), or the like.

The transmission unit 203 generates the uplink reference signal in accordance with the control signal, which is input from the control unit 202, performs the coding and the modulation on the uplink data (the transport block), which is input from the higher layer processing unit 201, multiplexes the PUCCH, the PUSCH, and the generated uplink reference signal, and transmits a result of the multiplexing to the base station apparatus 1 through the transmit and receive antenna 205.

The coding unit 2031 performs the coding, such as the convolutional coding or the block coding, on the uplink control information that is input from the higher layer processing unit 201. Furthermore, the coding unit 2031 performs the turbo coding, based on information that is used for scheduling of the PUSCH.

The modulation unit 2032 performs the modulation on coded bits, which are input from the coding unit 2031, in compliance with the modulation scheme that is notified with the downlink control information, such as the BPSK, the QPSK, the 16 QAM, or the 64 QAM, or in compliance with a modulation scheme that is prescribed in advance for every channel.

The uplink reference signal generation unit 2033 generates a sequence that is obtained according to a rule (formula) which is prescribed in advance, based on a physical cell identity (PCI) (also referred to as a Cell ID) for identifying the base station apparatus 1, a bandwidth to which the uplink reference signal is mapped, a cyclic shift that is notified with the uplink grant, a parameter value for generation of a DMRS sequence, and the like.

In accordance with the control signal that is input from the control unit 202, the multiplexing unit 2034 re-maps the modulation symbols on the PUSCH in parallel and then performs Discrete Fourier Transform (DFT) on the re-mapped modulation symbols. Furthermore, the multiplexing unit 2034 multiplexes PUCCH and PUSCH signals and the generated uplink reference signal for every transmit antenna port. More precisely, the multiplexing unit 2034 maps the PUCCH and PUSCH signals and the generated uplink reference signal to resource elements for every transmit antenna port.

The wireless transmission unit 2035 performs the Inverse Fast Fourier Transform (IFFT) on the signal that results from the multiplexing, performs modulation in compliance with an SC-FDMA scheme, generates an SC-FDMA symbol, attaches a CP to the generated SC-FDMA symbol, generates a digital signal in a base band, converts the digital signal in the base band into an analog signal, generates an in-phase component and an orthogonal component at an intermediate frequency from the analog signal, removes superfluous frequency components with respect to an intermediate frequency band, converts (up-converts) a signal at the intermediate frequency into a signal at a high frequency, removes superfluous frequency components, performs power amplification, and transmits a final result to the transmit and receive antenna 205 for transmission.

Figure 5:
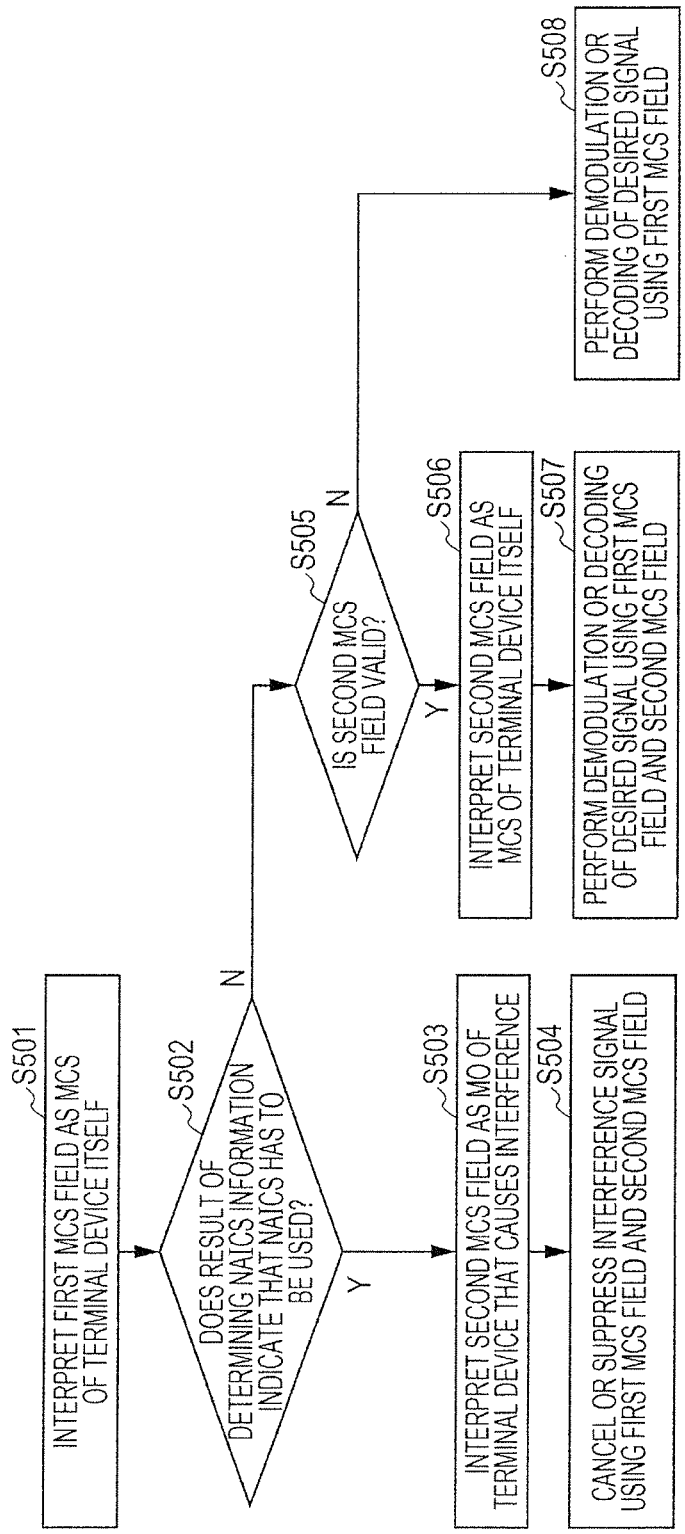
FIG. 5 is a diagram illustrating a processing flow for a signal detection unit 2043.

FIG. 5 is a diagram illustrating a flow for processing by the signal detection unit 2043.

In S501, the signal detection unit 2043 interprets the first MCS field as the MCS of the terminal device itself.

In S502, the signal detection unit 2043 determines whether or not a result of determining the NAICS information of the terminal device 2 indicates that the NAICS has to be used. In a case where the result of determining the NAICS information of the terminal device 2 indicates that the NAICS has to be used, proceeding to S503 takes place, and in a case where the result of determining the NAISC information thereof does not indicate that NAICS has to be used, proceeding to S505 takes place.

In S503, the signal detection unit 2043 interprets the second MCS field as the MO of the terminal device that causes the interference.

In S504, the signal detection unit 2043 cancels or suppresses the interference signal, using the first MCS field, the MO of the terminal device that causes the interference, which is included in the second MCS field, the channel estimate, or the like. For example, in a case where the SLIC is used, the signal detection unit 2043 generates a replica of the interference signal using the MO of the terminal device that causes the interference and the channel estimate of the interference signal, subtracts the replica of the interference signal from the PDSCH that is input from the demultiplexing unit 2042, and thus detects the downlink data that is destined for the terminal device itself.

In S505, the signal detection unit 2043 determines whether or not the second MCS field is valid. For example, in a case where the code point indicating that the second MCS field is invalid is configured to be in the downlink control information, it is determined that the second MCS field is invalid. In a case where the second MCS field is valid, proceeding to S506 takes place, and in a case where the second MCS field is invalid, proceeding to S508 takes place.

In S506, the signal detection unit 2043 interprets the second MCS field as the MCS of the terminal device itself.

In S507, the signal detection unit 2043 demodulates and decodes signals in the transport block 1 and the transport block 2, using the first MCS field, the second MCS field, the channel estimate, and the like.

In S508, the signal detection unit 2043 demodulates and decodes the signal in the transport block 1 using the first MCS field, the channel estimate, and the like.

At this point, as one example, according to the present embodiment, it is assumed that a result of determining the pieces of NAICS information of the terminal device 2A and the terminal device 2B indicates that the NAICS has to be used and that a result of determining the NAICS information of the terminal device 2C does not indicates that the NAICS has to be used.

Processing by the signal detection unit 2043 of the terminal device 2A according to the present embodiment is described. In S501, the first MCS field is interpreted as the MCS of the terminal device 2A. In S502, because the result of determining the NAICS information in the terminal device 2A indicates that the NAICS has to be used, proceeding to S503 takes place. In S503, the second MCS field is interpreted as the MOs of the terminal device 2B and the terminal device 2C. In S504, the signal detection unit 2043 generates the replica of the interference signal using the MO of the terminal device 2B, the MO of the terminal device 2C, and the channel estimate, cancels or suppresses the interference signal, and thus detects the downlink data that is destined for the terminal device 2A.

Processing by the signal detection unit 2043 of the terminal device 2B according to the present embodiment is described. In S501, the first MCS field is interpreted as the MCS of the terminal device 2B. In S502, because the result of determining the NAICS information in the terminal device 2B indicates that the NAICS has to be used, proceeding to S503 takes place. In S503, the second MCS field is interpreted as the MOs of the terminal device 2A and the terminal device 2C. In S504, the signal detection unit 2043 generates the replica of the interference signal using the MO of the terminal device 2A, the MO of the terminal device 2C, and the channel estimate, cancels or suppresses the interference signal, and thus detects the downlink data that is destined for the terminal device 2B.

Processing by the signal detection unit 2043 of the terminal device 2C according to the present embodiment is described. In S501, the first MCS field is interpreted as the MCS of the terminal device 2C. In S502, because the result of determining the NAICS information in the terminal device 2C does not indicate that the NAICS has to be used, proceeding to S505 takes place. In S505, if the second MCS field of the terminal device 2C is valid, proceeding to S506 takes place, and pieces of downlink data in the transport block 1 and the transport block 2 are detected. On the other hand, in S505, if the second MCS field of the terminal device 2C is invalid, proceeding to S508 takes place, and the downlink data in the transport block 1 is detected.

Moreover, according to the present embodiment, as illustrated in FIG. 1, a communication system in which the inter-user interference occurs is assumed to be a target, but a communication system in which inter-cell interference occurs may be available. In the communication system in which the inter-cell interference occurs, reception signals of the terminal device include a desired signal that is destined for the terminal device itself (the first terminal device) and a signal that is destined for the terminal device (the second terminal device) that causes the interference. The base station apparatus that makes a connection to the first terminal device coordinates with a different base station apparatus, and receives information (the terminal information, the MO, or the like of the second terminal device) for canceling or suppressing the signal of the second terminal device. The base station apparatus that makes a connection to the first terminal device determines whether or not the first terminal device is instructed to use the NAICS. In a case where the first terminal device is instructed to use the NAICS, the MO of the second terminal device is configured to be in the second MCS field that is destined for the first terminal device. In a case where the result of determining the NAICS information that is notified from the higher layer processing unit 201 indicates that the NAICS has to be used, the terminal device interprets the second MCS field as the MO of the second terminal device, and cancels or suppresses the interference signal.

In this manner, a terminal device according to the present invention is a first terminal device that communicates with a base station apparatus, including a higher layer processing unit that determines NAICS information indicating whether or not NAICS has to be used, a reception unit that receives downlink control information which is transmitted from the base station apparatus, and a control unit that changes interpretation of the downlink control information based on a configuration that is determined by the higher layer processing unit, in which in a case where a result of determining the NAICS information that is determined in the higher layer processing unit indicates that the NAICS has to be used, the control unit interprets the second MCS field as information indicating a modulation scheme of a second terminal device, among a first MCS field for a transport block 1 and a second MCS field for a transport block 2, which are included in the downlink control information. Furthermore, in the terminal device according to the present invention, the second MCS field includes information indicating modulation schemes of one or more of the second terminal devices. Furthermore, in the terminal device according to the present invention, interference due to communication in the second terminal device is canceled or suppressed using the second MCS field.

Furthermore, a base station apparatus according to the present invention is a base station apparatus that communicates with a first terminal device, including a higher layer processing unit that configures NAICS information indicating whether or not the first terminal device is instructed to use NAICS, a control unit that changes a parameter of downlink control information based on whether or not the NAICS information indicates that the NAICS has to be used, and a transmission unit that transmits the downlink control information, in which in a case where the NAICS information indicates that the NAICS has to be used, information indicating a modulation scheme of a second terminal device is configured to be in the second MCS field, among a first MCS field for a transport block 1 and a second MCS field for a transport block 2, which are included in the downlink control information, and the first MCS field and the second MCS field are transmitted to the first terminal device.

By performing the processing as described above, the terminal device suitably notifies a parameter indispensable to cancel or suppress the interference signal, and the interference can be canceled or suppressed using the parameter. Therefore, the terminal device can reduce a degradation in reception performance due to the interference.

A program running on the base station apparatus and the terminal device according to the present invention is a program (a program for causing a computer to perform functions) that controls a CPU and the like in such a manner as to realize the functions according to the embodiments of the present invention, which are described above. Then, pieces of information that are handled in the apparatus and the device are temporarily stored in a RAM while being processed. Thereafter, the pieces of information are stored in various ROMs or HDDs, and if need arises, is read by the CPU to be modified or written. As a recording medium on which to store the program, of a semiconductor medium (for example, a ROM, a nonvolatile memory card, or the like), an optical storage medium (for example, a DVD, an MO, an MD, a CD, a BD, or the like), a magnetic storage medium (for example, a magnetic tape, a flexible disk, or the like), and the like, any one may be available. Furthermore, in some cases, the functions according to the embodiments described above are realized by executing the loaded program, and in addition, the functions according to the present invention are realized by performing processing in conjunction with an operating system or other application programs, based on an instruction from the program.

Furthermore, in a case where the programs are distributed on the market, the programs, each of which is stored on a portable recording medium, can be distributed, or can be transferred to a server computer that is connected through a network such as the Internet. In this case, a storage device of the server computer is also included in the present invention. Furthermore, some or all of the portions of the terminal device and the base station apparatus according to the embodiments described above may be realized as an LSI that is a typical integrated circuit. Each functional block of a reception device may be individually built into a chip, and some or all the functional blocks may be integrated into a chip. In a case where each of the functional blocks is integrated into an integrated circuit, an integrated circuit control module is added that controls the functional blocks.

Furthermore, a technique for the integrated circuit is not limited to an LSI, and an integrated circuit for the functional block may be realized as a dedicated circuit or a general-purpose processor. Furthermore, if with advances in a semiconductor technology, a circuit integration technology with which an LSI is replaced appears, it is also possible to use an integrated circuit to which such a technology is applied.

Moreover, the invention in the present application is not limited to the embodiments described above. Furthermore, application of the terminal device according to the invention in the present application is not limited to a mobile station apparatus. It goes without saying that the terminal device can be applied to a stationary-type electronic apparatus that is installed indoors or outdoors, or a non-movable-type electronic apparatus, for example, an AV apparatus, a kitchen apparatus, a cleaning* washing machine, an air conditioner, office equipment, a vending machine, and other household apparatuses.

The embodiments of the present invention are described in detail above referring to the drawings, but specific configurations are not limited to the embodiments. A design and the like within a scope not departing from the gist of the present disclosure also fall within the scope of the claims.

INDUSTRIAL APPLICABILITY

The present invention is suitable for using a terminal device, a base station apparatus, and an integrated circuit.

Moreover, the present international application claims the benefits of Japanese Patent Application No. 2014-004854 filed on Jan. 15, 2014, the entire contents of which are incorporated herein by reference.

REFERENCE SIGNS LIST

1 BASE STATION APPARATUS
2A, 2B, 2C TERMINAL DEVICE
101 HIGHER LAYER PROCESSING UNIT
102 CONTROL UNIT
103 TRANSMISSION UNIT
104 RECEPTION UNIT
105 TRANSMIT AND RECEIVE ANTENNA
1011 RADIO RESOURCE CONTROL UNIT
1012 SCHEDULING UNIT
1013 NAICS INFORMATION GENERATION UNIT
1031 CODING UNIT
1032 MODULATION UNIT
1033 DOWNLINK REFERENCE SIGNAL GENERATION UNIT
1034 MULTIPLEXING UNIT
1035 WIRELESS TRANSMISSION UNIT
1041 WIRELESS RECEPTION UNIT
1042 DEMULTIPLEXING UNIT
1043 DEMODULATION UNIT

1044 DECODING UNIT
201 HIGHER LAYER PROCESSING UNIT
202 CONTROL UNIT
203 TRANSMISSION UNIT
204 RECEPTION UNIT
205 TRANSMIT AND RECEIVE ANTENNA
2011 RADIO RESOURCE CONTROL UNIT
2012 SCHEDULING INFORMATION INTERPRETATION UNIT
2013 NAICS INFORMATION INTERPRETATION UNIT
2031 CODING UNIT
2032 MODULATION UNIT
2033 UPLINK REFERENCE SIGNAL GENERATION UNIT
2034 MULTIPLEXING UNIT
2035 WIRELESS TRANSMISSION UNIT
2041 WIRELESS RECEPTION UNIT
2042 DEMULTIPLEXING UNIT
2043 SIGNAL DETECTION UNIT

The invention claimed is:

1. A terminal device that communicates with a base station device, comprising:
higher layer processing circuitry configured to receive configuration information;
reception circuitry configured to monitor downlink control information (DCI) which is transmitted from the base station device; and
signal detection circuitry configured to detect a modulation and coding scheme (MCS) for the terminal device based on the monitored DCI,
wherein the configuration information includes whether a prescribed reception scheme for a multi-user transmission is applied or not,
in a case where the prescribed reception scheme is applied, the signal detection circuitry detects a plurality of interfering modulation orders,
in a case where the signal detection circuitry detects a first modulation order out of the plurality of modulation orders and a second modulation order out of the plurality of modulation orders, the DCI includes a first 2-bit field and a second 2-bit field, and the first modulation order is determined based on a value indicated by the first 2-bit field and the second modulation order is determined based on a value indicated by the second 2-bit field, and
in a case where the prescribed reception scheme is not applied, the signal detection circuitry detects the MCS for the terminal device from the DCI.

2. The terminal device according to claim 1, wherein
the DCI format is defined to indicate two transport blocks, and
the signal detection circuitry determines the MCS of the each transport block based on the DCI format.

3. A base station device that communicates with a terminal device, comprising:
higher layer processing circuitry configured to transmit configuration information to the terminal device; and
transmission circuitry configured to transmit, to the terminal device, downlink control information (DCI) via a physical downlink control channel (PDCCH) and downlink data via a physical downlink shared channel (PDSCH);
wherein
the downlink data is modulated, based on a modulation and coding scheme (MCS) for the terminal device in the DCI, the configuration information includes whether a prescribed reception scheme for the terminal device for a multi-user transmission is applied or not,
in a case where the prescribed reception scheme is applied, the transmission circuitry transmits a plurality of interfering modulation orders,
in a case where the transmission circuitry transmits a first modulation order out of the plurality of modulation orders and a second modulation order out of the plurality of modulation orders, the DCI includes a first 2-bit field and a second 2-bit field, and the first modulation order is determined based on a value indicated by the first 2-bit field and the second modulation order is determined based on a value indicated by the second 2-bit field, and
in a case where the prescribed reception scheme is not applied, the transmission circuitry transmits the MCS for the terminal device in the DCI.

4. An integrated circuit that is mounted into a terminal device that communicates with a base station device, comprising:
higher layer processing circuitry configured to receive configuration information;
reception circuitry configured to monitor downlink control information (DCI) via a physical downlink control channel (PDCCH); and
signal detection circuitry configured to detect a modulation and coding scheme (MCS) for the terminal device based on the monitored DCI,
wherein
the configuration information includes whether a prescribed reception scheme for a multi-user transmission is applied or not,
in a case where the prescribed reception scheme is applied, the signal detection circuitry detects a plurality of interfering modulation orders,
in a case where the first modulation order is detected out of the plurality of modulation orders and a second modulation order is detected out of the plurality of modulation orders, the DCI includes a first 2-bit field and a second 2-bit field, and the first modulation order is determined based on a value indicated by the first 2-bit field and the second modulation order is determined based on a value indicated by the second 2-bit field, and
in a case where the prescribed reception scheme is not applied, the signal detection circuitry detects the MCS for the terminal device from the DCI.

* * * * *

UNITED STATES PATENT AND TRADEMARK OFFICE
CERTIFICATE OF CORRECTION

PATENT NO. : 11,038,612 B2  
APPLICATION NO. : 16/059920  
DATED : June 15, 2021  
INVENTOR(S) : Kozue Yokomakura et al.

Page 1 of 1

It is certified that error appears in the above-identified patent and that said Letters Patent is hereby corrected as shown below:

On the Title Page

Change:
"Related U.S. Application Data
(62) Division of application No. 15/111,772, filed as application No. PCT/JP2014/008022 on Nov. 20, 2014, now abandoned"
To:
--Related U.S. Application Data
(62) Division of application No. 15/111,772, filed as application No. PCT/JP2014/080822 on Nov. 20, 2014, now abandoned--

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*